United States Patent
Ericsson et al.

(10) Patent No.: US 12,330,091 B2
(45) Date of Patent: Jun. 17, 2025

(54) FILTER DEVICE

(71) Applicant: Bluewater Sweden AB, Stockholm (SE)

(72) Inventors: Stefan Ericsson, Stockholm (SE); Fredrik Lennartsson, Stockholm (SE); Christian Malm, Stockholm (SE); Kim Börjesson, Stockholm (SE); Per-Åke Klasson, Stockholm (SE)

(73) Assignee: BLUEWATER SWEDEN AB, Stockholm (SE)

( * ) Notice: Subject to any disclaimer, the term of this patent is extended or adjusted under 35 U.S.C. 154(b) by 527 days.

(21) Appl. No.: 17/618,382

(22) PCT Filed: Jun. 18, 2020

(86) PCT No.: PCT/EP2020/066853
§ 371 (c)(1),
(2) Date: Dec. 10, 2021

(87) PCT Pub. No.: WO2020/260111
PCT Pub. Date: Dec. 30, 2020

(65) Prior Publication Data
US 2022/0305410 A1    Sep. 29, 2022

(30) Foreign Application Priority Data
Jun. 26, 2019    (SE) .................................. 1950790-4

(51) Int. Cl.
*B01D 24/18*    (2006.01)
*B01D 24/00*    (2006.01)
(Continued)

(52) U.S. Cl.
CPC ........... *B01D 24/18* (2013.01); *B01D 24/002* (2013.01); *B01D 24/007* (2013.01);
(Continued)

(58) Field of Classification Search
CPC .... B01D 24/18; B01D 24/002; B01D 24/007; B01D 27/105; B01D 29/11; B01D 29/50;
(Continued)

(56) References Cited

U.S. PATENT DOCUMENTS 5,342,519 A * 8/1994 Friedmann ............. B01D 35/30
                                                       210/DIG. 17
6,517,717 B1 * 2/2003 H. ang. kansson .... B01D 29/96
                                                       210/493.1
(Continued)

FOREIGN PATENT DOCUMENTS

CN    203556212 U    4/2014
WO    90/02597 A1    3/1990
(Continued)

OTHER PUBLICATIONS

International Search Report from corresponding International Application PCT/EP2020/066853 dated Aug. 10, 2020, 4 pages.
(Continued)

*Primary Examiner* — Pranav N Patel
(74) *Attorney, Agent, or Firm* — Ronald M. Kachmarik; Cooper Legal Group LLC

(57) ABSTRACT

A filter unit is provided for filtering a liquid. The filter unit is intended to be connected to a cap including a first liquid passage and a second liquid passage 114. The filer unit includes: a canister; and a filter cartridge rotatably arranged within the canister, the filter cartridge includes a first filter connection for liquid to pass through, the first filter connection is intended to be connected to the first liquid passage in the cap, wherein the canister is intended to be rotatably attachable to the cap such that, when the canister is attached to the cap by a rotating action, the filter cartridge is stationary to the cap.

11 Claims, 4 Drawing Sheets

(51) Int. Cl.
  *B01D 27/10* (2006.01)
  *B01D 29/11* (2006.01)
  *B01D 29/50* (2006.01)

(52) U.S. Cl.
  CPC ............ *B01D 27/105* (2013.01); *B01D 29/11* (2013.01); *B01D 29/50* (2013.01); *B01D 2201/303* (2013.01); *B01D 2201/304* (2013.01); *B01D 2201/305* (2013.01); *B01D 2201/306* (2013.01); *B01D 2201/347* (2013.01); *B01D 2201/4015* (2013.01); *B01D 2201/4092* (2013.01)

(58) Field of Classification Search
  CPC ........ B01D 2201/303; B01D 2201/304; B01D 2201/305; B01D 2201/306; B01D 2201/347; B01D 2201/4015; B01D 2201/4092; B01D 2101/02; B01D 2201/295; B01D 2201/301; B01D 2201/302; B01D 2201/34; B01D 29/96; B01D 35/30; B01D 24/10; B01D 35/00; B01D 27/00; B01D 29/00
  See application file for complete search history.

(56) References Cited

U.S. PATENT DOCUMENTS

| | | |
|---|---|---|
| 9,067,154 B1 | 6/2015 | Branscomb et al. |
| 2001/0037969 A1 | 11/2001 | Stankowski |
| 2003/0010698 A1 | 1/2003 | Fritze |
| 2004/0159600 A1 | 8/2004 | Stankowski |
| 2004/0182777 A1* | 9/2004 | Stankowski ......... B01D 63/024 |
| | | 210/443 |
| 2008/0237109 A1* | 10/2008 | Fritze .................... B01D 61/20 |
| | | 210/194 |
| 2010/0163477 A1 | 7/2010 | Noh et al. |
| 2011/0220592 A1 | 9/2011 | Ruprecht |
| 2012/0228206 A1 | 9/2012 | Kim |
| 2012/0324938 A1 | 12/2012 | Yoon |
| 2013/0186815 A1* | 7/2013 | Cupit .................... B01D 35/30 |
| | | 210/418 |
| 2013/0193054 A1* | 8/2013 | Beard .................... B01D 29/21 |
| | | 210/232 |
| 2017/0252682 A1* | 9/2017 | Gustafson ............. B01D 29/111 |
| 2021/0138365 A1* | 5/2021 | Girondi ................. B01D 35/30 |

FOREIGN PATENT DOCUMENTS

| | | |
|---|---|---|
| WO | 00/68151 A2 | 11/2000 |
| WO | 00/68151 A3 | 11/2000 |
| WO | 03/002228 A1 | 1/2003 |
| WO | 2010/004315 A2 | 1/2010 |
| WO | 2010/004315 A3 | 1/2010 |
| WO | 2015002307 A1 | 1/2015 |
| WO | 2017/151336 A1 | 9/2017 |

OTHER PUBLICATIONS

Swedish Search Report from Corresponding Swedish Patent Application No. 1950790-4, dated Jan. 23, 2020, 2 pages.
Swedish Office Action from Corresponding Swedish Patent Application No. 1950790-4, dated Feb. 8, 2023, 32 pages.
Chinese Office Action from Corresponding Chinese Patent Application No. 202010590605.6, dated Sep. 28, 2023, 15 pages.
Chinese Office Action from corresponding Chinese Application No. 202010590605.6 dated Jul. 31, 2024.
European Office Action from Corresponding European Patent Application No. 20736582.6, dated Oct. 17, 2024.

\* cited by examiner

FILTER DEVICE

TECHNICAL FIELD

The present invention relates generally to filters for purifying fluids like for example water, and particularly to disposable filters for use in devices for purifying drinking water. The filter according to the invention is intended to facilitate assembly and replacement of filter parts.

BACKGROUND

In the process of cleaning liquids, such as water, normally purifying devices of different types are used depending on the application. The purifying devices normally contain one or more filters that with time may be worn-out and which means that the purifying device need to be replaced. The purifying device with filters are normally formed in one piece such as a molded container having inlet and outlet slots for connection to a system with a liquid to be cleaned. Through the inlet and outlet slots water is allowed to enter and exit an internal cavity with a filter. Often, the purifying device is disposable because of cheap material enclosing the filters. Hence, it is common for the whole purifying device to be replaced when the filters within the purifying device are worn out. This makes it difficult to recycle the filters units efficiently and this may be intensive for natural resources, increasing the amount of waste.

The attachment and detachment of purifying devices may also be a cumbersome process since the at least two connections, an inlet and an outlet, need to be both detached and attached properly when changing the purifying unit. Depending on type of residues left in the filters from the cleaning process it may not be desirable to handle the filters in a way needed having them cleaned.

To this end there is a need to overcome at least some disadvantages in the prior art.

SUMMARY

It is an object of the present inventive concept to mitigate, alleviate or eliminate one or more of the above-identified deficiencies in the art and disadvantages singly or in combination.

According to a first aspect of the inventive concept there is provided a filter unit for filtering a liquid, said filter unit is intended to be connected to a cap comprising a first liquid passage and a second liquid passage, said filter unit comprising;

a canister; and a filter cartridge rotatably arranged within the canister, the filter cartridge comprises a first filter connection for liquid to pass through, said first filter connection is intended to be connected to said first liquid passage in said cap; wherein the canister is intended to be rotatably attachable to the cap such that, when the canister is attached to said cap by a rotating action, the filter cartridge is stationary to the cap.

Thus, the present invention is based on the idea of providing a filter unit facilitating filter change and facilitating recycling of filter parts. The present invention may also be advantageous in that the rotatably arranged filter cartridge within the canister may have a swivel functionality to the canister when in connection to the cap, which in turn may facilitate detachment of the canister from the cap. This may be especially advantageous when the cap is fixed. By swivel functionality may here be meant that the canister may be rotated without rotating the filter cartridge within the canister. In this way the filter cartridge is intended to not to rotate relative to the cap when in connection to said cap. The filter cartridge is intended to be stationary to the cap when canister, enclosing the filter cartridge, is rotated relative to the cap. Hence, the filter cartridge may be intended to have a fixed position relative the cap when the canister is rotated.

According to an embodiment of the present invention the filter unit may have a cylindrical shape and extend along an axis A though the center of the filter unit, and the canister may be intended to be rotatably attachable to the cap by rotation around axis A.

According to an embodiment of the present invention the filter cartridge may be concentrically arranged in the canister.

According to an embodiment of the present invention the filter cartridge comprise: a top section comprising the first filter connection and a second filter connection intended to be connected to said second liquid passage in said cap; and a filter holder for holding at least one filter piece, said top section may be attached to said filter holder.

This may provide for improved swivel connection between the filter unit and the cap when the filter unit is connected to said cap. The present embodiment may also be advantageous in that it may provide for facilitated assembly and/or disassembly of the filter unit and the filter cap.

According to an embodiment of the present invention the at least one filter piece comprises at least one of granulated activated carbon, mesh fabric, nylon grid, cotton foam, plastic foam, polyester foam, stainless steel grid.

This may provide for a varied filter functionality and an adaptation of the filter to the liquid to be filtered may be done. This may provide for the possibility of removing natural organic matter and/or organic micro-pollutants from the liquid.

According to an embodiment of the present invention a gasket is arranged to seal the junction between the filter cartridge and the canister.

This may improve filter functionality since less liquid risk leaking from the container into the environment. This may also reduce the risk of water leaking inside the filter unit and thus it may reduce the risk of unfiltered water passing the filter unit.

According to an embodiment of the present invention the top section may comprise a third filter connection intended to be in connection with a third liquid passage in the cap.

This may provide for an increased liquid flow through the filter unit when in use.

According to an embodiment of the present invention the filter unit may be intended to function in a first mode and a second mode when connected to said cap; wherein the second and third liquid passage is arranged as an outlet when the filter unit is in said first mode when in use and; the second and third liquid passage are arranged as an inlet when the filter unit is in said second mode when in use.

According to an embodiment of the present invention the filter unit may be intended to function in a first mode and a second mode when connected to said cap; wherein the first liquid passage is arranged as an inlet when the filter unit is in said first mode when in use and; the first liquid passage is arranged as an outlet when the filter unit is in said second mode when in use.

At least one of the above embodiments may be advantageous in that the liquid passing the filter unit may flow through the filter unit in either direction depending on the mode.

According to an embodiment of the present invention the first filter connection, the second filter connection and the third filter connection comprises at least one gasket intended to seal the junction between said connections and corresponding liquid passages when said filter unit (100) is connected to said cap (110).

This may improve filter functionality since less liquid risk leaking from the container into the environment. This may also reduce the risk of water leaking inside the filter unit and thus it may reduce the risk of unfiltered water passing the filter unit.

According to an embodiment of the present invention the canister comprises a canister protrusion intended for locking on to a cap protrusion in said cap when said canister is rotated relative to said cap.

According to an embodiment of the present invention the canister may be intended to be connected to said cap by a bayonet coupling.

The above mentioned embodiments may provide a quick coupling of the canister to the cap. Thus, this may provide for a quick change of filter unit, and more specifically a quick change of filter cartridge.

According to an embodiment of the present invention the canister is threaded and intended to be rotatably attached to corresponding threads in the cap when the canister is connected to said cap.

The embodiment may provide a quick attachment of the canister to the cap. Thus, this may provide for a quick change of filter cartridge.

According to an embodiment of the present invention the filter holder 170 encloses at least part of the at least one filter piece 180.

This may provide for increased filter functionality. When the filter holder encloses at least part of the at least one filter piece the liquid may pass the filter pieces in a desired order. In other words, when the filter holder encloses at least part of the at least one filter piece the liquid may not be able to enter or exit the filter piece from the sides into the rest of the cavity in the filter unit. The liquid may then enter or exit the filter piece from the bottom or top of the filter piece, depending on flow direction and thus if the filter functions in said first or second mode.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc]" are to be interpreted openly as referring to at least one instance of said element, device, component, means, step, etc., unless explicitly stated otherwise.

DETAILED DESCRIPTION

Figure 1:
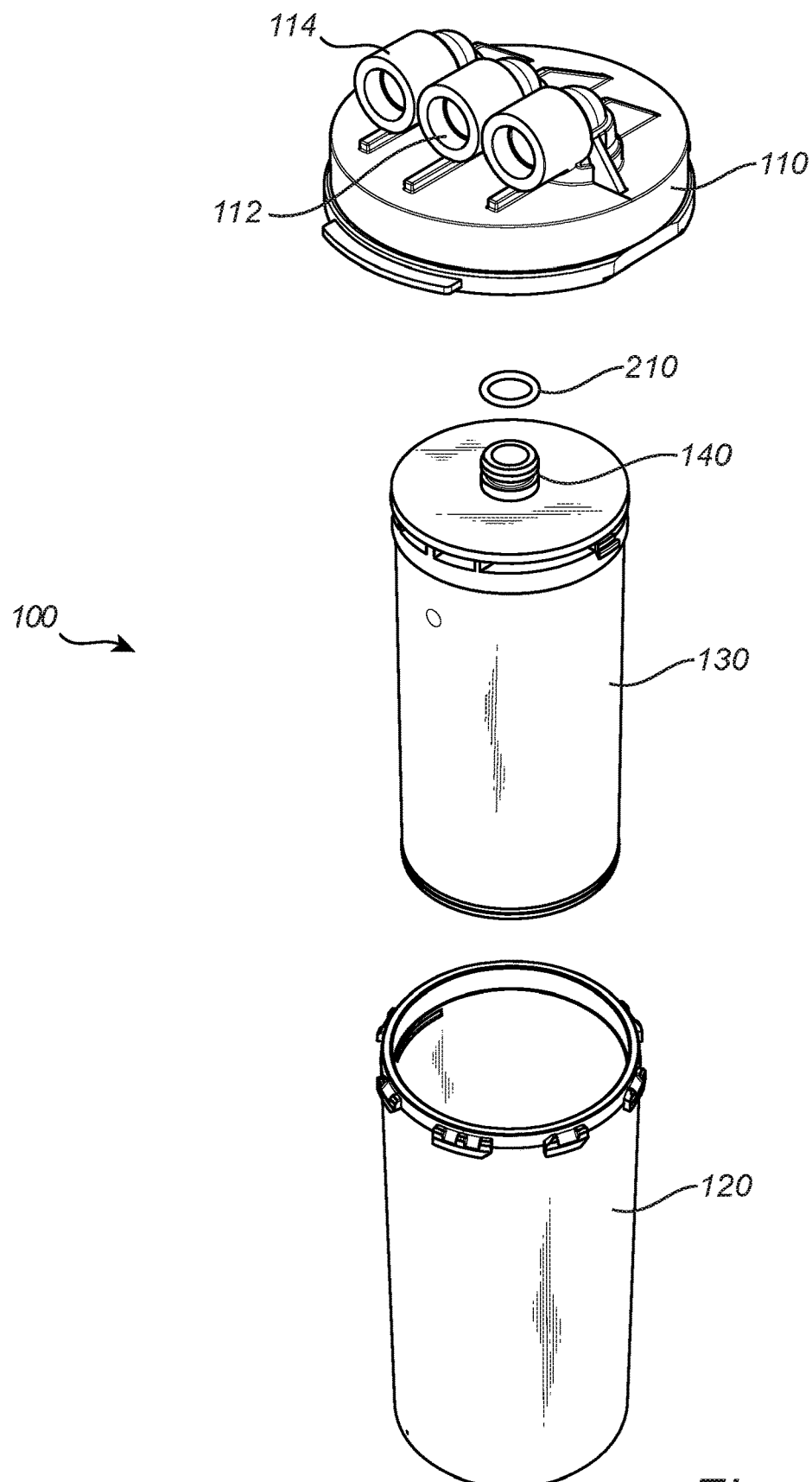
FIG. 1 schematically shows an exploded view of the filter unit according to at least one embodiment of the present invention.

FIG. 1 shows an exploded view of the filter unit 100 according to at least one embodiment of the present invention. In FIG. 1 a filter unit 100 is provided for filtering a liquid, said filter unit is intended to be connected to a cap 110 which comprises a first liquid passage 112 and a second liquid passage 114. The filter unit 100 comprises a canister 120 comprising a filter cartridge 130 rotatably arranged within the canister 120. The filter cartridge 130 comprises a first filter connection 140 for liquid to pass through. The first filter connection 140 is intended to be connected to said first liquid passage 112 in said cap 110. The canister 120 is intended to be rotatably attachable to the cap 110 such that, when the canister 120 is attached to said cap 110 by a rotating action, the filter cartridge 130 is stationary to the cap 110.

By the first filter connection 140 being intended to be connected to said first liquid passage 112 may be meant that the first filter connection 140 may come in contact with the first liquid passage 112 in the cap 110 when the canister 140 is attached to the cap 110. When said canister 140 is connected this way liquid may pass through said first filter connection 140 and said first liquid passage.

By the first filter connection 140 being intended to be connected to said first liquid passage 112 may be meant that the first filter connection 140 may be fitted to said first liquid passage 112 in said cap 110 when the canister 140 is attached to the cap 110. The first filter connection 140 may be intended to enclose a connection on the inside of the cap 110 to said first liquid passage 112 or a connection on the inside of the cap 110 to said first liquid passage 112 may be intended to enclose the first filter connection 140.

When the canister 120 is not attached to the cap 110, the filter cartridge 130 may be allowed to rotate freely within the canister 120. The canister 120 may be moved in contact with the cap 110 when attaching the canister 120 to said cap 110. The first filter connection 140 may then connect to the first liquid passage 112 in the cap 110.

The filter unit 100 may be intended to connect to said cap 110, more specifically the canister 120 may be intended to connect to the cap 110. The filter cartridge may be positioned within the canister 120. When the canister 120 is attached to the cap 110 they may constitute a containment within. Within this containment the filter cartridge 130 may be located. When the canister 120 is attached to the cap 110, the second liquid passage 114 in the cap 110 may be in liquid connection to the containment constituted by the canister 120 and the cap 110.

The filter unit 100 may be intended to function in two modes. When the filter unit 100 and the cap 110 are connected the liquid may pass through the filter unit 100 in these two modes, a first mode or a second mode.

When the filter unit 100 and the cap 110 are connected and in the first mode the liquid will enter the filter unit 100 through said first liquid passage 112 and the liquid will exit the filter unit 100 through said second liquid passage 114. When in the second mode the liquid will enter the filter unit 100 through said second liquid passage 114 and the liquid will exit the filter unit 100 through said first liquid passage 112. In other words, when in said first mode, the second liquid passage 114 is an outlet and the first liquid passage is an inlet. When in said second mode, the second liquid passage 114 is an inlet and the first liquid passage is an outlet.

In other words, the second liquid passage 114 may be intended as an outlet when the filter unit 100 and the cap 110 are in said first mode when in use. The second liquid passage 114 may be intended as an inlet when the filter unit 100 and the cap 110 are in said second mode when in use. The first liquid passage 112 may be intended as an inlet when the filter unit 100 and the cap 110 are in said first mode when in use. The first liquid passage 112 may be intended as an outlet when the filter unit 100 and the cap 110 are in said second mode when in use.

Preferably the mode may not be changed under operation and set beforehand. Preferably, the filter cartridge 130 may be adapted to what mode to be using in order to have proper filtering of the liquid. For example, a certain order of filtering may be desirable, such beginning to filter out larger fractions of particles and then stepwise filter out smaller particles and/or functionality of removing natural organic matter and/or organic micro-pollutants from the liquid.

When the canister 120 is attached to the cap 110, the liquid may enter the filter unit 100 and the cap 110 through the first liquid passage 112, and flow through the first filter connection 140, via the filter cartridge 130 into the containment constituted by the canister 120 and the cap 110 and subsequently exit the filter unit 100 and the cap 110 through the second liquid passage 114.

When the canister 120 is attached to the cap 110, the liquid may enter the filter unit 100 and the cap 110 through the second liquid passage 114 before reaching the containment constituted by the canister 120 and the cap 110, subsequently the liquid may pass the filter cartridge 130 and the first filter connection 140 before exiting the filter unit 100 and cap 110 through the first liquid passage 112.

The first filter connection 140 may comprise a gasket 210 intended to seal the junction between said first filter connection 140 and the first liquid passage 112 in the cap 110.

The canister 120 may be intended to be moved in a rotating motion in order to attach the canister 120 to the cap 110. When doing so, the filter cartridge 130 inside the canister 120 may be fixed to the cap 110 and may thus be allowed to rotate within the canister 120. The rotatably arranged filter cartridge 130 within the canister 120 may thus have a swivel functionality to the canister 120 when the canister 120 is connected to the cap 110, which in turn may facilitate attachment and/or detachment of the canister 120 to/from the cap 110. This may be especially advantageous when the cap 110 is fixed.

The canister may be rotated without rotating the filter cartridge within the canister. In this way the filter cartridge is intended not to be rotated relative to the cap. The filter cartridge may be intended to have a fixed position or a stationary position relative the cap when the canister is rotated.

The canister 120 may be intended to be attached or connected to the cap 110 by a bayonet coupling or similar, described in more detailed below, such that when the canister 120 and the cap 110 is placed in contact with each other, the canister 120 may be rotated relative the cap 110, the canister 120 may in this way be locked to the cap 110. This provides for quick attachment of the filter since the amount of rotation needed is significantly less than when screwing the parts together. Preferably the rotation may be more than 1 degree and less than 90 degrees, more preferably less than 45 degrees, most preferably the rotation may be less than 30 degrees.

The canister 120 may be threaded and intended to be rotatably attached to corresponding threads in the cap 110 when the canister 120 is connected to said cap 110.

Figure 2:
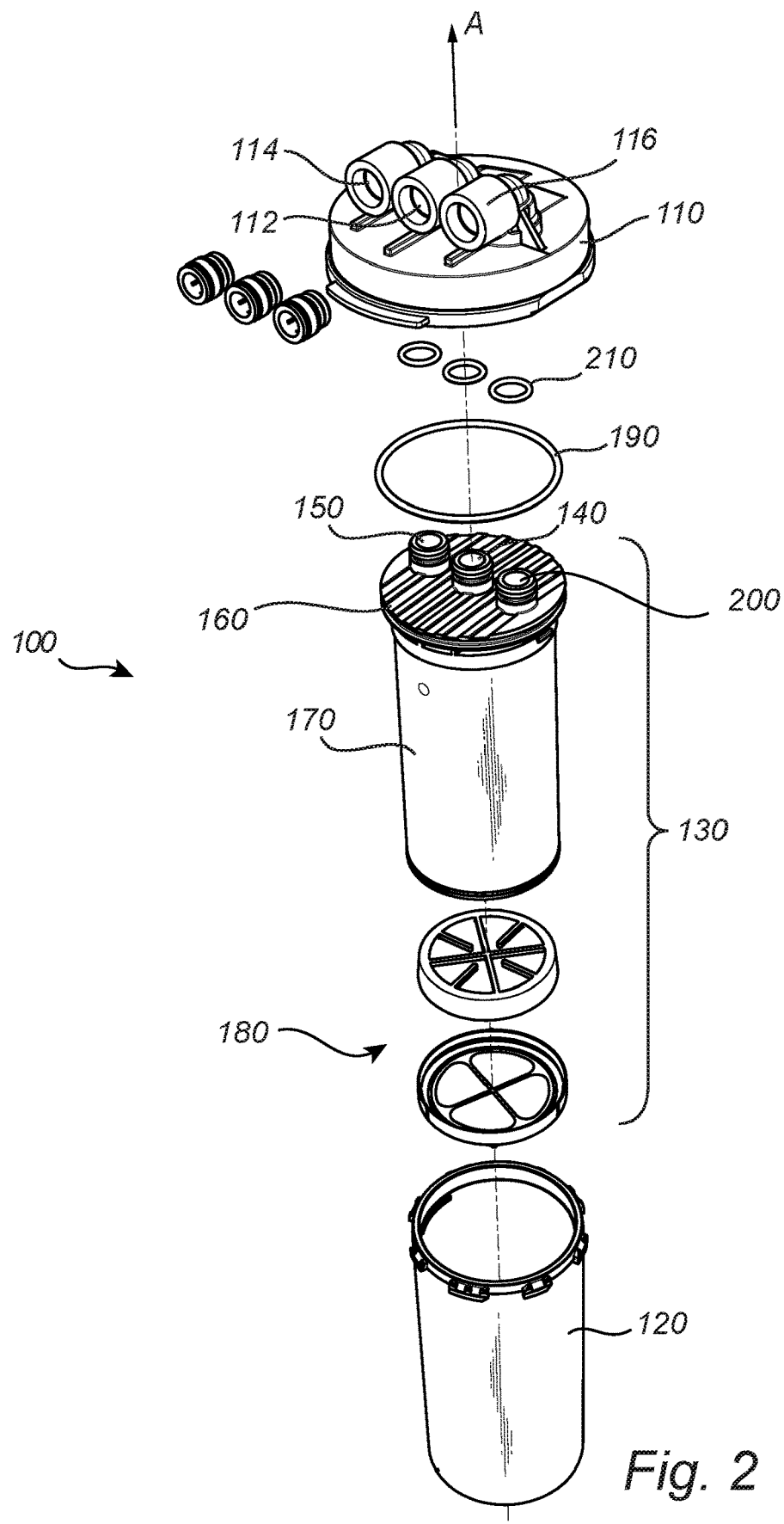
FIG. 2 schematically shows an exploded view of the filter unit according to at least one embodiment of the present invention.

FIG. 2 schematically shows an exploded view of the filter unit 100 according to at least one embodiment of the present invention. In FIG. 2 the filter cartridge 130 further comprises a top section 160 comprising the first filter connection 140. The filter cartridge 130 may further comprise a second filter connection 150 intended to be connected to said second liquid passage 114 in said cap 110. The filter cartridge 130 may further comprise a filter holder 170 for holding at least one filter piece 180. Said top section 160 may be attached to said filter holder 170. The filter holder 170 may be cylindrical. The filter holder 170 may enclose the at least one filter piece 180.

When the filter holder encloses at least part of the at least one filter piece the liquid may pass the filter pieces in a desired order. In other words, when the filter holder encloses at least part of the at least one filter piece 180 the liquid may not be able to enter or exit the filter piece 180 from the sides into the rest of the cavity in the filter unit when the filter unit is in use. The liquid may then enter or exit the filter piece 180 from the bottom or top of the filter piece 180, depending on flow direction and thus if the filter functions in said first or second mode.

As previously described, the filter unit 100 may be intended to function in a first mode and a second mode when the filter unit 100 is connected to the cap 110. As described previously, the second liquid passage 114 may be intended as an outlet when the filter unit 100 and the cap 110 is in said first mode when in use. The second liquid passage 114 may be intended as an inlet when the filter unit 100 is in said second mode when in use. The first liquid passage 112 may be intended as an inlet when the filter unit 100 is in said first mode when in use. The first liquid passage 112 may be intended as an outlet when the filter unit 100 is in said second mode when in use.

Hence, the second filter connection 150 may be an outlet when the filter unit 100 is in connection to the cap 110 and in said first mode when in use. The second filter connection 150 may be an inlet when the filter unit 100 is in connection to the cap 110 and in said second mode when in use. The first filter connection 140 may be an inlet when the filter unit 100 is in said first mode when in use. The first liquid passage 112 may be intended as an outlet when the filter unit 100 is in said second mode when in use.

FIG. 2 also shows that the top section (160) comprises a third filter connection (200) intended to be in connection with a third liquid passage (116) in the cap (110).

In other words, the cap 110 may comprise a third liquid passage 116. The top section 160 may comprise a third filter connection 200 intended to be in connection with said third liquid passage 116.

The second and third liquid passages 114, 116 may be intended as outlets when the filter unit 100 is connected to said cap 110 and are in said first mode when in use. The second and third liquid passages 114, 116 may be arranged as inlets when the filter unit 100 is connected to said cap 110 and is in said second mode when in use.

Hence, the second and third filter connections 150, 200 may be arranged as outlets when the filter unit 100 is in said first mode when in use. The second and third filter connections 150, 200 may be arranged as inlets when the filter unit 100 is in said second mode when in use.

As previous mentioned, the filter cartridge 130 may be adapted to what mode to be using in order to have proper filtering of the liquid. Preferably, the mode may not be changed under operation and set beforehand.

Preferably, the filter unit 100 and the cap 110 are intended to be used in said second mode, such that the first liquid passage 112 may be intended as an outlet. The second and third liquid passages 114, 116 may then be arranged as inlets. This may provide for improved filter functionality since a larger inlet cross section to the filter unit 100 compared to the outlet from the filter unit 100 may be provided. This may also provide for a proper pressure fall to be achieved over the filter piece 180.

Figure 3:
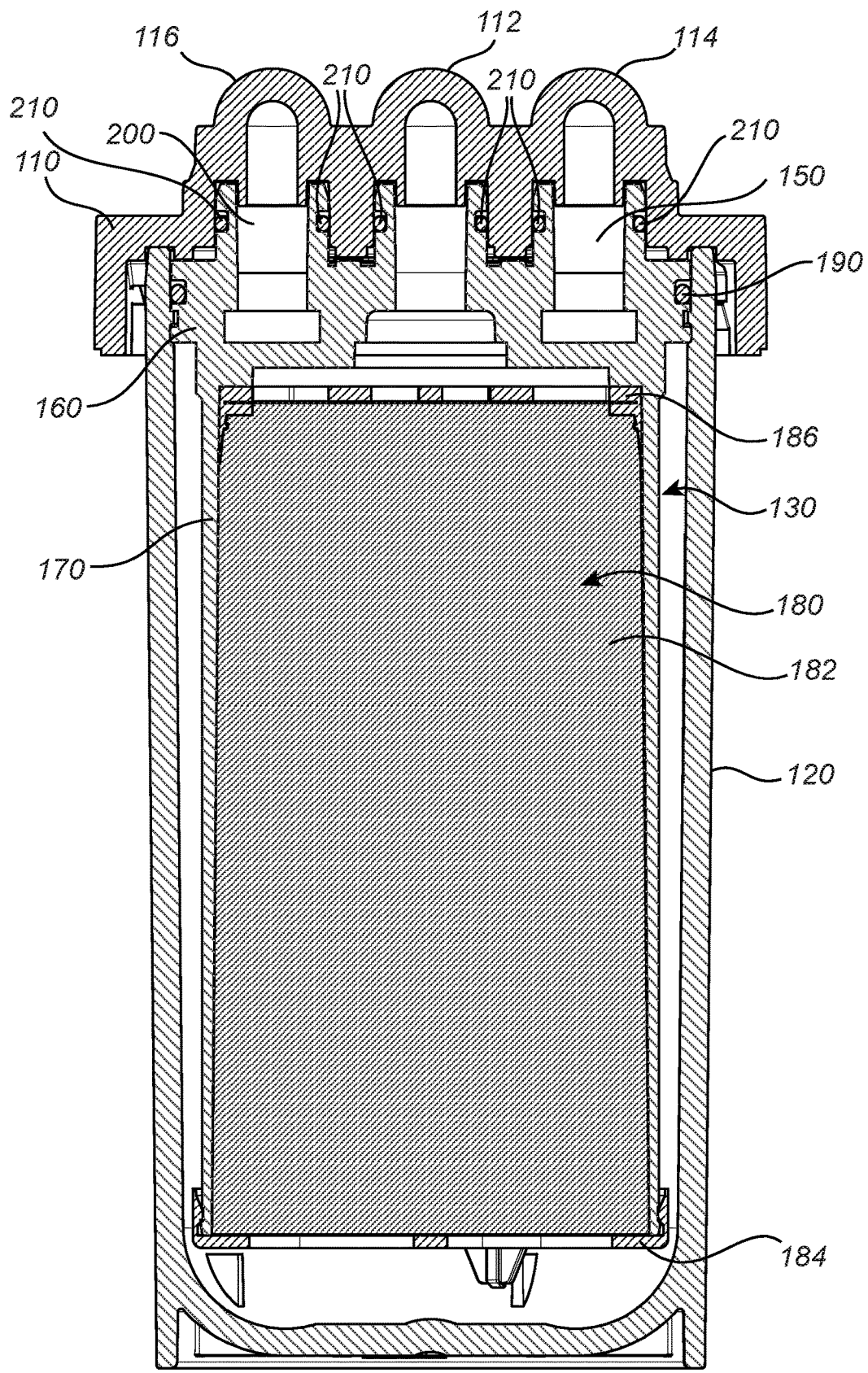
FIG. 3 schematically shows a cross-section view of the filter unit according to at least one embodiment of the present invention.

FIG. 3 schematically shows a cross-section view of the filter unit 100 according to at least one embodiment of the present invention. The filter unit 100 in FIG. 3 is shown in an assembled state according to at least one embodiment of the present invention. The first filter connection 140, the second filter connection 150 and the third filter connection 200 comprises at least one gasket 210 intended to seal the junction between said connections 140, 150, 200 and corresponding liquid passages 112, 114, 116 when said filter unit is connected to said cap 110.

In other words, the first filter connection 140 may comprise a gasket 210 intended to seal the junction between said first filter connection 140 and the first liquid passage 112 in the cap 110. The second filter connection 150 may comprise a gasket 210 intended to seal the junction between said second filter connection 150 and the second liquid passage 114 in the cap 110. The third filter connection 200 may comprise a gasket 210 intended to seal the junction between said third filter connection 200 and the third liquid passage 116 in the cap 110.

The gasket 210 may be arranged circumferentially around the first filter connection 140 when said first filter connection 140 is intended to be enclosed by the first liquid passage 112 in order to properly seal the junction between the first liquid passage 112 and the first filter connection 140.

The gasket 210 may be arranged circumferentially around the second filter connection 150 when said second filter connection 150 is intended to be enclosed by the second liquid passage 114 in order to properly seal the junction between the second liquid passage 114 and the second filter connection 150.

The gasket 210 may be arranged circumferentially around the third filter connection 200 when said third filter connection 200 is intended to be enclosed by the third liquid passage 116 in order to properly seal the junction between the third liquid passage 116 and the third filter connection 200.

As earlier described each filter connection 140, 150, 200 may be intended to enclose respective liquid passages 112, 114, 116. The gaskets 210 may then be circumferentially arranged on the inside of each filter connection 140, 150, 200 or intended to be circumferentially arranged around said liquid passages 112,114,116 in order to seal the junction between the filter connection 140, 150, 200 and the respective liquid passage 112, 114, 116 when connecting the filter unit 100 to the cap 110.

The at least one filter piece 180 may comprise at least one of granulated activated carbon, mesh fabric, nylon grid, cotton foam, plastic foam, polyester foam, stainless steel grid and citric acid. The at least one filter piece 180 may comprise several filter pieces 180 of different type. For example, the different filter pieces 180 may be adapted to different types of filtering, such as filter different fractions of particles and/or the possibility of removing natural organic matter from the liquid when filtering. Using the at least one filter piece 180 with activated carbon may provide for the possibility of removing organic micro-pollutants from the liquid. Hence, the at least one filter piece 180 may be adapted to the situation and the purpose of filtering. The at least one filter piece 180 may also be adapted to the flow direction of the liquid in order to, for example, filter out larger fractions of particles before filtering the smaller and/or before removing the organic matter by filtration.

The at least one filter piece 180 may comprise citric acid in order to decalcify the liquid. This may be especially advantageous when the liquid is water. Decalcification may be advantageous for the filter unit 100 and/or for components located after the filter unit 100 in the flow direction. It may provide less sediments or deposits from calcium, i.e limescale, in the filter unit 100, cap 110 and/or in components arranged after the filter unit 100 in the flow direction, such as other filter units or tanks.

As seen in FIG. 3, several units of the at least one filter piece 180 may be present, in this case three units of the at least one filter piece 180. A second filter piece 184 arranged at the bottom of the filter holder 170. A first filter piece 182 arranged within the filter holder 170. A third filter piece 186 arranged at the top of the filter holder 170. Where the top is the side of the filter cartridge 130 facing the liquid passages 112, 114, 116 in the cap 110 and the bottom is the opposite direction. The second filter piece 184 and/or the third filter piece 186 may be arranged as holders for the first filter piece 182. The second filter piece 184 and/or the third filter piece 186 may be arranged as pre-filter units in order to filter out particles before the liquid enters the first filter piece 182. The first filter piece 182 may comprise any of a granulated activated carbon, mesh fabric, nylon grid, cotton foam, plastic foam, polyester foam, stainless steel grid or citric acid. The second filter piece 184 and/or the third filter piece 186 may comprise any of a granulated activated carbon, mesh fabric, nylon grid, cotton foam, plastic foam, polyester foam, stainless steel grid or citric acid.

The first filter piece 182 may comprise citric acid. The first filter piece 182 may comprise citric acid in combination with a carbon filter. The citric acid may be positioned in any of the first filter piece 182, the second filter piece 184 and/or the third filter piece 186 in order to achieve decalcification of the liquid. The first filter piece 182, the second filter piece 184 and/or the third filter piece 186 may be of different relative sizes than illustrated in FIG. 3. For instance, the second and/or third filter piece 184, 186 may be larger and may comprise citric acid.

A gasket 190 may be arranged to seal the junction between the filter cartridge 130 and the canister 120. The gasket 190 may be arranged circumferentially around the top section 160. When the filter cartridge 130 is arranged within the canister 120, the gasket 190 may seal the junction between the top section 160 and the canister 120. This may provide for reduced risk of liquid leaking from the container into the environment when the cap 110 is attached to the canister 120. This may also reduce the risk of water leaking inside the filter unit 100 and thus it may reduce the risk of unfiltered water passing the filter unit 100.

Figure 4:
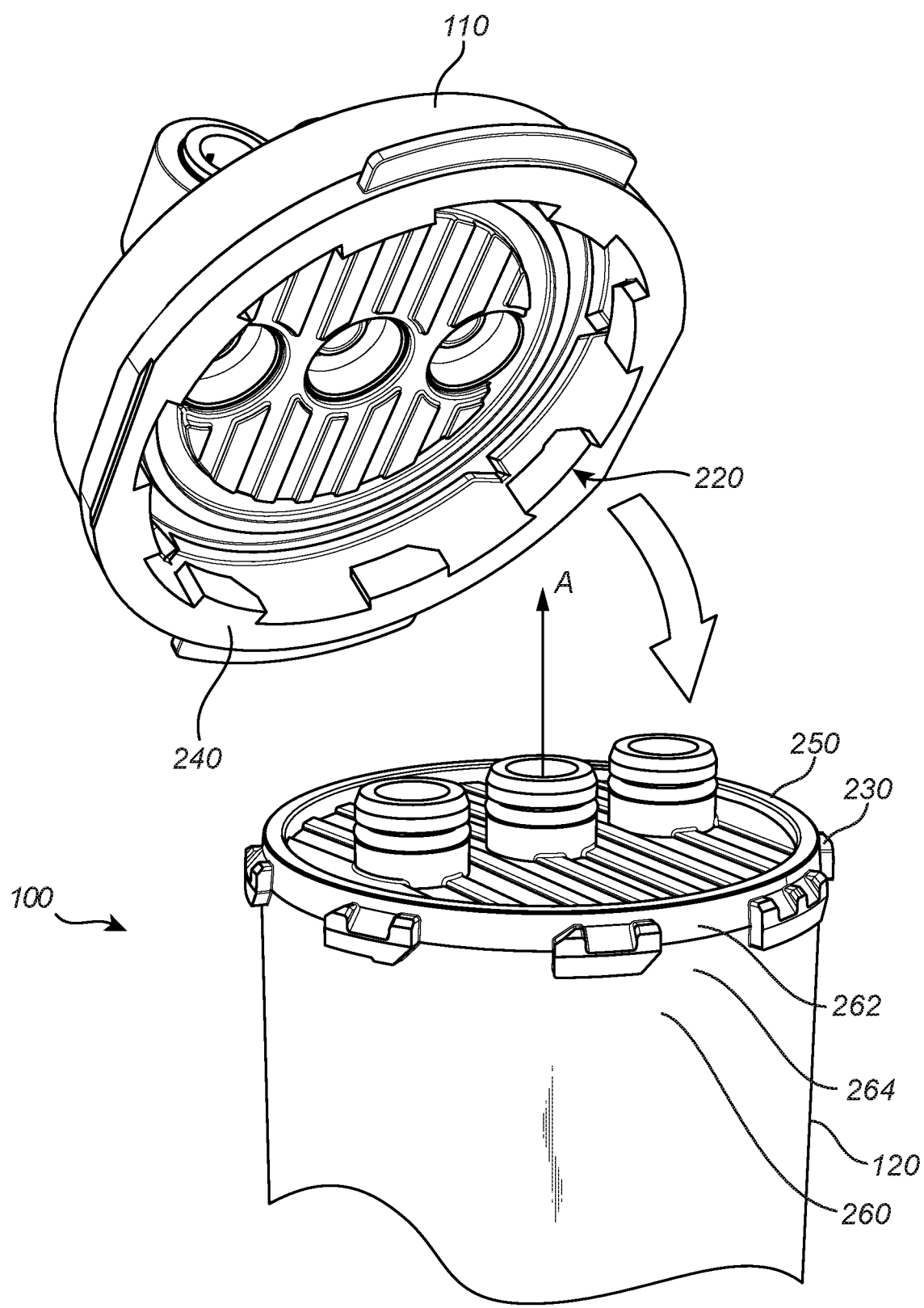
FIG. 4 schematically shows an example embodiment according to the present invention.

FIG. 4 schematically shows an example embodiment according to the present invention. FIG. 4 shows that the filter unit 100 has a cylindrical shape and extends along an axis A though the center of the filter unit 100, and the canister 120 is rotatably attachable to the cap 110 by rotation around axis A.

The filter unit 100 may be elongated in a cylindrical shape. The axis, A, may be arranged parallel to the elongation of the filter unit 100. The cap 110 may be substantially arranged as a disc. The axis, A, may be arranged within the filter unit 100 and arranged centrally within the filter unit 100. The axis, A, may have a direction towards the cap 110. The axis, A, may be parallel to the normal to a surface of the cap 110 facing the canister 120.

The filter unit may have a cylindrical shape and extend along an axis, A, arranged centrally within the filter unit, said axis A may be arranged perpendicular to a diameter of the cylindrical shaped filter unit; the canister may be rotatably attachable to the cap such that it rotates around said axis, A.

As previously described the canister 120 may be intended to be attached to said cap 110 by a bayonet coupling or similar. FIG. 4 also show that the canister 120 may comprise a canister protrusion 230 intended for locking on to a cap protrusion 220 in said cap 110 when said canister 120 is rotated relative to said cap 110.

In other words, the cap 110 may comprise a cap protrusion 220. The canister 120 may comprise a canister protrusion 230 intended for locking on to the cap protrusion 220 when said canister 120 is rotated relative to said cap 110.

In other words, the cap 110 may be attached to the canister 120 by a connection similar to that of a bayonet coupling. The canister protrusions 230 may be intended to hook on to the cap protrusions 220 when the canister 120 is rotated relative the cap 110. The cap 110 may comprise the cap protrusions 220 alternating with slots intended for the cap protrusions 230 to enter when said canister 120 is moved in contact with the cap 110. The cap protrusions 220 may comprise stoppage protrusions hindering the canister protrusions 230 to rotate too far when the canister 120 is rotated relative the cap 110. In other words, the cap protrusions 220 may comprise stoppage protrusions intended to hinder the canister protrusions 230 to rotate passed the cap protrusion 220 to neighboring slots when the canister 120 is rotated relative the cap 110.

The cap 110 may comprise a surface 240 facing away from the liquid passages 112,114,116. The canister 120 may comprise a surface 250 intended to face the liquid passages 112,114,116 of the cap 110 when the canister 120 is assembled to the cap 110.

The canister 120 may comprise an outer surface area 260 enclosing the canister 120. The outer surface area 260 may comprise at least two sections, a first area section 262 and a second area section 264. The first area section may be arranged circumferentially around the canister 120 and in connection with the surface 250.

The first area section 262 may comprise the canister protrusions 230. In other words, the canister protrusions 230 may be arranged on the canister 120 within the first area section 262.

When bringing the canister 120 together with the cap 110, the canister protrusions 230 may pass the cap protrusions 220. Hence, the canister protrusions 230 may be intended to first pass the cap protrusions when attaching the canister 120 to the cap 110 and secondly be attached to the cap protrusions 220 when being rotated relative the cap 110.

In other words, when the canister 120 is attached to the cap 110 the canister 120 may be moved towards the cap 110, the surface 250 will end up closer to the liquid passages than the surface 240. The canister protrusions 230, located in the first area section 262, will end up closer to the liquid passages 112,114,116 than the cap protrusions 220. This makes it possible to have the canister 120 fixed to the cap 110 by rotating the canister 120 relative said cap 110 such that the canister protrusions 230 may be fixed to the cap protrusions 220. In other words, the canister protrusions 230 may enter the slots and passing the cap protrusions 220 when the canister 120 is moved in contact with the cap 110.

The canister 120 may be threaded and intended to be rotatably attached to corresponding threads in the cap 110 when the canister 120 is connected to said cap 110.

Having the bayonet coupling or similar, as described above, may be highly preferred since it may provide a quicker coupling of the canister 120 to the cap 110, and thus a faster change of filter unit 100 and more specifically a faster change of filter cartridge 130.

The invention claimed is:

1. A filter unit for filtering a liquid, said filter unit is intended to be connected to a cap comprising a first liquid passage and a second liquid passage, said filter unit comprising:
a canister;
a filter cartridge rotatably arranged within the canister, the filter cartridge comprises a first filter connection for liquid to pass through, said first filter connection is intended to be connected to said first liquid passage in said cap, wherein the first filter connection comprises a gasket intended to seal a junction between said first filter connection and the first liquid passage;
a top section comprising the first filter connection and a second filter connection intended to be connected to said second liquid passage in said cap; and
a filter holder for holding at least one filter piece;
wherein the canister is intended to be rotatably attachable to the cap such that, when the canister is attached to said cap by a rotating action, the filter cartridge is stationary to the cap by the first filter connection coming into contact with the first liquid passage in the cap, and said top section is attached to said filter holder.

2. The filter unit according to claim 1 wherein the filter unit has a cylindrical shape and extends along an axis A though the center of the filter unit, and the canister is intended to be rotatably attachable to the cap by rotation around axis A.

3. The filter unit according to claim 1 wherein the filter cartridge is concentrically arranged in the canister.

4. The filter unit according to claim 1 wherein the at least one filter piece comprises at least one of granulated activated carbon, mesh fabric, nylon grid, cotton foam, plastic foam, polyester foam, stainless steel grid.

5. The filter unit according to claim 4 wherein a gasket is arranged to seal a junction between the filter cartridge and the canister.

6. The filter unit according to claim 1, wherein the top section comprises a third filter connection intended to be in connection with a third liquid passage in the cap.

7. The filter unit according to claim 6, wherein the first filter connection, the second filter connection and the third filter connection comprises at least one gasket intended to seal junctions between said connections and corresponding liquid passages when said filter unit is connected to said cap.

8. The filter unit according to claim 1, wherein the canister comprises a canister protrusion intended for locking on to a cap protrusion in said cap when said canister is rotated relative to said cap.

9. The filter unit according to claim 8, wherein the canister is intended to be connected to said cap by a bayonet coupling.

10. The filter unit according to claim 1, wherein the canister is threaded and intended to be rotatably attached to corresponding threads in the cap when the canister is connected to said cap.

11. The filter unit according to claim 1, wherein the filter holder encloses at least part of the at least one filter piece.

* * * * *